Patented Mar. 12, 1929.

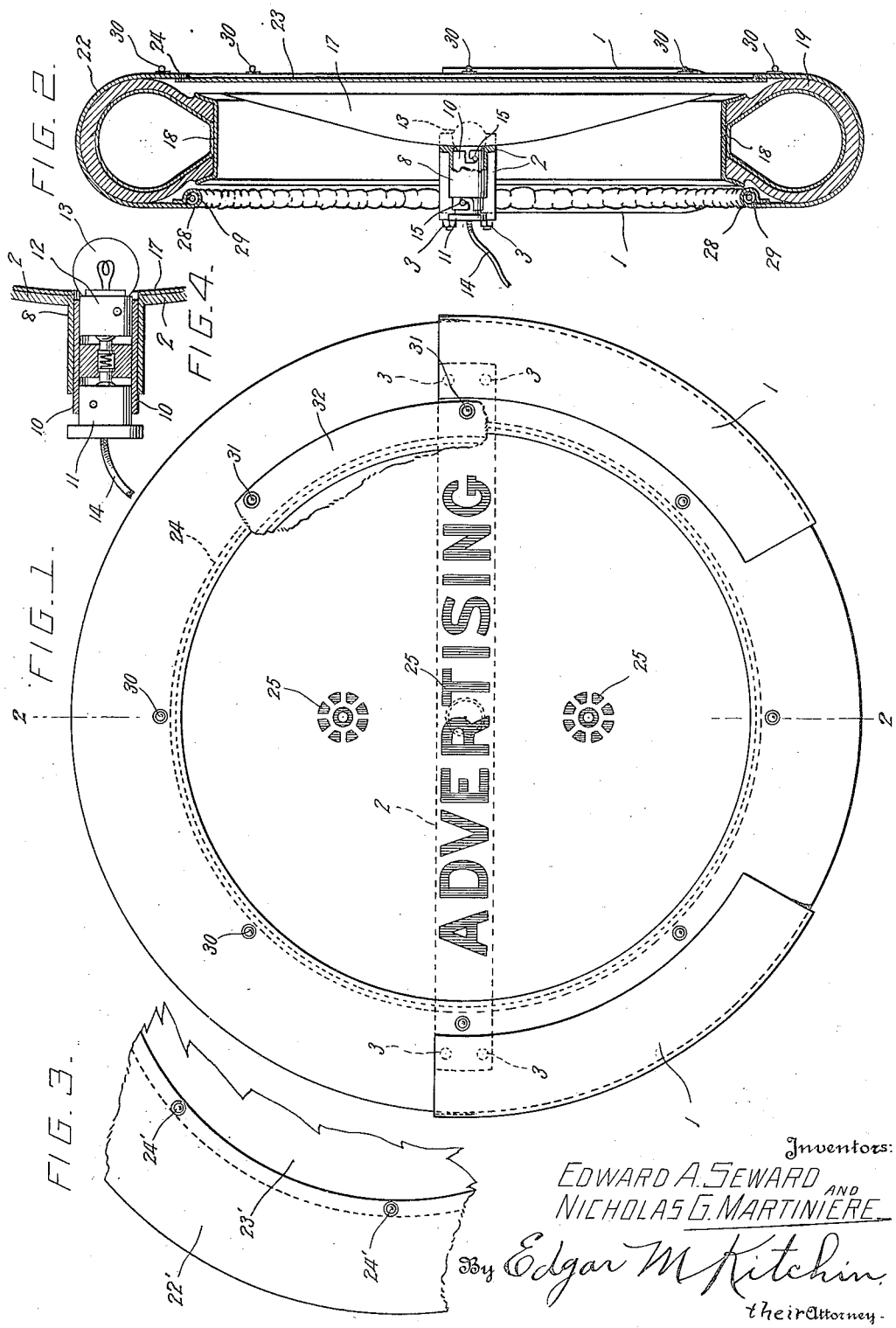

1,705,422

UNITED STATES PATENT OFFICE.

EDWARD A. SEWARD AND NICHOLAS G. MARTINIERE, OF COLUMBUS, GEORGIA, ASSIGNORS TO NATIONAL BUS DIRECTORY CO., INC., OF COLUMBUS, GEORGIA, A CORPORATION OF GEORGIA.

DISPLAY APPARATUS.

Application filed July 17, 1926. Serial No. 123,099.

This invention relates to improvements in display apparatus, and more particularly to supports and illuminating apparatus for display signs.

The object in view is the most effective utilization of the spare tire and engaged parts usually at the rear of an automobile as a support for a combined advertising and danger sign.

A further object is to effectively impress upon the minds of drivers in the rear of a car or otherwise adjacent thereto the relative location of the car, and at the same time convey a message of commercial or other value additional to the danger signal.

With these and further objects in view as will in part hereinafter become apparent and in part be stated, the invention comprises certain novel constructions, combinations and arrangements of parts as subsequently specified and claimed.

In the accompanying drawings,—

Figure 1 is a view in side elevation of an apparatus embodying the features of the present invention, a fragment of a concealing sheet being indicated thereon.

Figure 2 is a transverse section taken on the plane indicated by line 2—2 of Figure 1, the reflector and other parts being seen in elevation and parts being broken away.

Figure 3 is a fragmentary elevation of a slightly modified embodiment.

Figure 4 is a vertical, longitudinal section through the light socket and connected parts, the parts being seen on a large scale detached.

Referring to the drawing by numerals, 1, 1 indicate parts of any well known or conventional spare tire carrier or bracket, the specific form illustrated being that of the trough type of carrier in which the spare tire is seated. Obviously, the carrier 1 of whatever specific construction is located at the rear or side of the car (as the case may be) and, for convenience of reference, will be assumed to be at the rear of a car. Relative direction will, therefore, be mentioned, assuming the car to be in front or in advance of the parts shown in the drawings.

A sleeve 8 is sustained by the carrier 1 in the center or as nearly the center as may be of the space surrounded by the spare tire. The connection between the sleeve 8 and the tire carrier is capable of a wide range of variations, it being preferable to utilize some form of anchorage which will rigidly retain the sleeve effectively in position without interfering with the mounting or demounting of the spare tire. One form of connection is seen in the drawings as consisting of a strap or bar 2 bolted or otherwise detachably anchored at 3, 3, to the parts of the carrier 1. The strap or bar 2 may be formed integral with or welded or otherwise appropriately connected to the sleeve 8, and in the rear of the strap is arranged a reflector 17 which is fixed to the strap by bolts, rivets, welding or otherwise, not illustrated, for affording a rigid, permanent support for the reflector 17. The reflector 17 is perforated centrally in line with the bore of the sleeve 8, and is a concaved disc with its perimeter equal approximately in diameter to the diameter of the space surrounded by the spare tire 19 and its carrying or removable rim 18. The reflector 17 is preferably slightly less in diameter than the diameter of the rim 18 so as to allow the rim to be readily removed and replaced across the reflector without removal of the reflector. The outer portions of the reflector 17 preferably lie outward of the main portion of the rim 18 and may lie in the plane of the rear flange of the rim.

Within the sleeve 8 is a removable sleeve 10 of the ordinary type such as commonly used for tail lamps and the like for affording electrical contact between a supply line and an electric light bulb, the usual spring plungers being arranged centrally within the sleeve and the outer portions at the ends of the sleeves being left open to form sockets and being provided with bayonet slots 15, 15, for detachably receiving the locking pins on the respective shanks 11 and 12 of the plug at the one end and the light 13 at the other, as is usual in tail light construction. A line wire 14 communicates through the plug and through the spring pressed plungers to the central contact of the light 13, the return thereof being grounded as usual. Obviously, a complete wire circuit may be employed, if desired, in which instance two-point contact will be provided, not shown, but of common and well known constructions. The sleeve 10 is retained in sleeve 8 merely by frictional contact and will ordinarily remain in place as initially introduced, but if any slight movement should occur incident to vibrations, the sleeve 10 is retained against escaping from sleeve 8 by the interlock of shanks 11 and 12 with the bayonet slots 13 and the outstanding parts connected with said shanks which are larger than the sleeve 8.

The light 13 has its shank 12 introduced through the central opening in reflector 17, so that the light outstands rearward of the central portion of the reflector and throws its rays incident to the action of the reflector rearward from the area surrounded by the spare tire.

Removably surrounding the spare tire 19 is a tire cover 22 having its inner edge formed into a continuous circular sleeve 28 enclosing an elastic cable 29 of coil spring or other appropriate constricting material designed to stress the material of the cover 22 after the manner of a stress of a draw-string for keeping the cover taut upon the tire 19 while permitting the cover to be readily removed by the stretching of the cable 29 and to be likewise replaced. Tire covers of the type indicated at 22, so far as the parts thus far described are concerned, are known, but it is customary to have the fabric of the cover 22 extend entirely across the area surrounded by the tire, whereas in the present invention the middle area, or an area somewhat greater than the diameter of the reflector 17, is omitted and a transparent sheet 23 is substituted, the sheet 23 being of celluloid or other appropriate transparent or translucent material and being anchored to the otherwise exposed edge of the outer or rear portion of the cover 22. The anchorage for practical purposes usually and preferably consists of a line or lines of stitching 24 extending through the fabric of the cover 22 and through the sheet 23. Obviously, other methods of connection may be utilized.

The transparent sheet 23 is thus located immediately outside of and in the rear of the reflector 17, and may be provided with any indicia, symbols, or other data desired and rendered especially conspicuous by the presence of the emanating light rays. One effective method of accentuating the value of the light rays is the provision of translucent areas 25, 25, with the balance of the transparent sheet 23 darkened to a greater or less degree as found desirable and preferable for accentuating the translucent indicia 25.

A cover 32 may be provided for covering up the transparent sheet 23 when desired, and, to this end, the cover 32 is provided with snap buttons of the glove fastener type, indiciated at 31, 31, adapted to cooperate with the snap studs 30, 30, carried by the cover 32. The cover 32 may be made from the material cut away from the original tire cover 22 by providing an appropriate border and stitching the same to the periphery of the cut-out disc, as indicated in the fragment seen in Figure 1.

Referring to Figure 3, it is to be noted that while the stitching 24 employed for connecting the transparent sheet 23 to the cover 22 is preferable and thoroughly practical, it is possible to employ any of various other methods of anchorage, one of which is indicated in Figure 3, in which 22' is the tire cover and 23' is the transparent sheet anchored thereto by snap fasteners 24', 24', of the glove button type.

The indicia 25 may, of course, assume the form of any appropriate advertising or other informatory legends or other signs or devices especially adapted to attract attention of observers and particularly drivers of other cars so as to both warn them against the nearness and location of the car carrying the indicia and at the same time convey the message expressed in the advertising or other legends.

What is claimed is:—

1. In display apparatus, the combination with a spare tire carrier and a tire mounted thereon, of a cover for said tire, a translucent disc attached to marginal portions of the cover and extending across substantially the entire space surrounded by the tire, and a light sustained by the tire carrier in the space surrounded by the tire.

2. In display apparatus, the combination with a spare tire carrier, of a bracket sustained thereby and having a light support located in the space substantially centrally of the space within a tire mounted on said carrier, a sleeve engaged by said light support, a reflector carried by said light support, light circuit connections extending through and sustained by the sleeve, said reflector being of an extent substantially equal to the extent of the area within the tire sustained by said tire carrier, and translucent display means extending across the reflector.

3. In display apparatus, the combination of a support adapted to be located substantially centrally of the area surrounded by a spare tire, a reflector carried by said support and having a perimeter substantially bordering said area, and the reflector extending for substantially the full extent of such area, a light for said reflector, and a translucent indicia sheet extending across said reflector for having its visibility increased by the rays from said light.

4. In display apparatus, the combination with a spare tire carrier, of a light socket support sustained thereby substantially centrally of the area surrounded by a tire supported by said tire carrier, a reflector carried by said support and facing outward of the tire and having an aperture registering with the light socket support, said reflector being proportioned to extend for substantially the full extent of said area, a light cooperating with the reflector and having a shank extending through said aperture, current supply means for the light, and a tire-carried indicia sheet extending across the exposed face of the reflector.

5. The combination with a spare tire carrier and a tire mounted thereon, of a cover for said tire, a translucent indicia sheet engaging the cover and occupying a location across the area surrounded by the tire and corresponding in extent substantially to that of said area and bearing indicia, and a light support for sustaining a light in said area.

6. The combination with a spare tire carrier and a tire mounted thereon, of a cover for said tire, a translucent indicia sheet engaging the cover and occupying a location across the area surrounded by the tire and corresponding in extent substantially to that of said area and bearing indicia, a light support for sustaining a light in said area, and a reflector for the light in back of the translucent sheet and of substantially the same extent as the translucent sheet.

7. The combination with a spare tire carrier and a tire mounted thereon, of a cover for said tire, a translucent indicia sheet engaging the cover and extending across the area surrounded by the tire in the rear thereof, a light support carried by the tire carrier at the front thereof, and a reflector connected to the light support and extending to the rear of the tire carrier and corresponding in area substantially to the area surrounded by the tire carrier.

8. The combination, with a spare tire carrier, and a tire mounted thereon, of a cover for said tire, a translucent indicia sheet engaging the cover and occupying a location across the area surrounded by the tire and corresponding in extent substantially to said area, a concaved disc reflector arranged with the major portion of its concavity within the space surrounded by the tire carrier and having its peripheral portions overlying the tire carrier at the rear thereof, and a light support at the front of the tire carrier engaging and sustaining said reflector.

In testimony whereof we affix our signatures.

EDWARD A. SEWARD.
NICHOLAS G. MARTINIERE.